United States Patent

[11] 3,561,769

[72] Inventors Robert H. Boynton
6 Westland Ave., Milford, Conn. 06460,
and James S. Boynton, 559 Pepper St.,
Monroe, Conn 06468

[21] Appl. No. 727,528
[22] Filed May 8, 1968
[45] Patented Feb. 9, 1971
Continuation-in-part of application Ser. No. 524,888, Feb. 3, 1966, now abandoned.

[54] RECORD PLAYERS
4 Claims, 6 Drawing Figs.

[52] U.S. Cl. .......... 274/9
[51] Int. Cl. .......... G11b 19/22
[50] Field of Search .......... 274/39, 9, 1.4, 10, 10R

[56] References Cited
UNITED STATES PATENTS
3,254,896 6/1966 Dennis .......... 274/10

*Primary Examiner*—Harry N. Haroian
*Attorney*—Delio and Montgomery

ABSTRACT: A mechanism for use in conjunction with automatic record changers, in order to momentarily stop a turntable while the record changer is permitting a record to fall onto the turntable. The mechanism includes a braking device for stopping the turntable and a device for preventing the drive system from moving the turntable.

INVENTORS
Robert H. Boynton
James S. Boynton

BY De Lio and Montgomery
ATTORNEYS

INVENTORS
Robert H. Boynton
James S. Boynton
BY DeLio and Montgomery
ATTORNEYS

RECORD PLAYERS

This application is a continuation-in-part of U.S. application Ser. No. 524,888 filed Feb. 3, 1966 now abandoned.

This invention relates to a mechanism for use in conjunction with automatic record changers and more particularly to a mechanism for momentarily stopping a turntable while the record changer is permitting a record to fall on the turntable.

Currently available record changers operate in such a manner that the turntable continues to move during the time interval that a record is dropped onto the turntable or onto a record which is already positioned on the turntable. Due to the configuration of record platters and particularly the older type records, commonly referred to as collectors' items, considerable wear of the record has occurred as a result of its being dropped onto a moving turntable. After a record falls on a rotating turntable, the record and the turntable will, after a short time interval, begin to rotate in unison. This, in the past has resulted in the frictional scratching of the dropped record against the turntable or against the record already on the turntable, until the record or records as the case may be, begin to rotate at the same speed. Although this situation is not generally apparent to the layman, one who is a high fidelity enthusiast will, over a period of time, recognize the deterioration in the quality of the original recording.

Accordingly, to alleviate the above situation and in an attempt to extend the high fidelity lifetime of records applicants have invented a new and improved device which may be incorporated in present-day record player devices.

It is therefore an object of this invention to provide a new and improved record playing device.

It is another object of this invention to provide a new and improved mechanism which may be adapted to operate in conjunction with the record changing apparatus of current record players.

It is a further object of this invention to provide a new and improved mechanism for preventing scratching of a record as it drops onto a turntable or a stack of records already on the turntable.

Still other objects and advantages of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference is had to the following description taken in conjunction with the accompanying drawings, in which the same reference numerals designate like or corresponding parts of the several views and in which.

Figure 1:
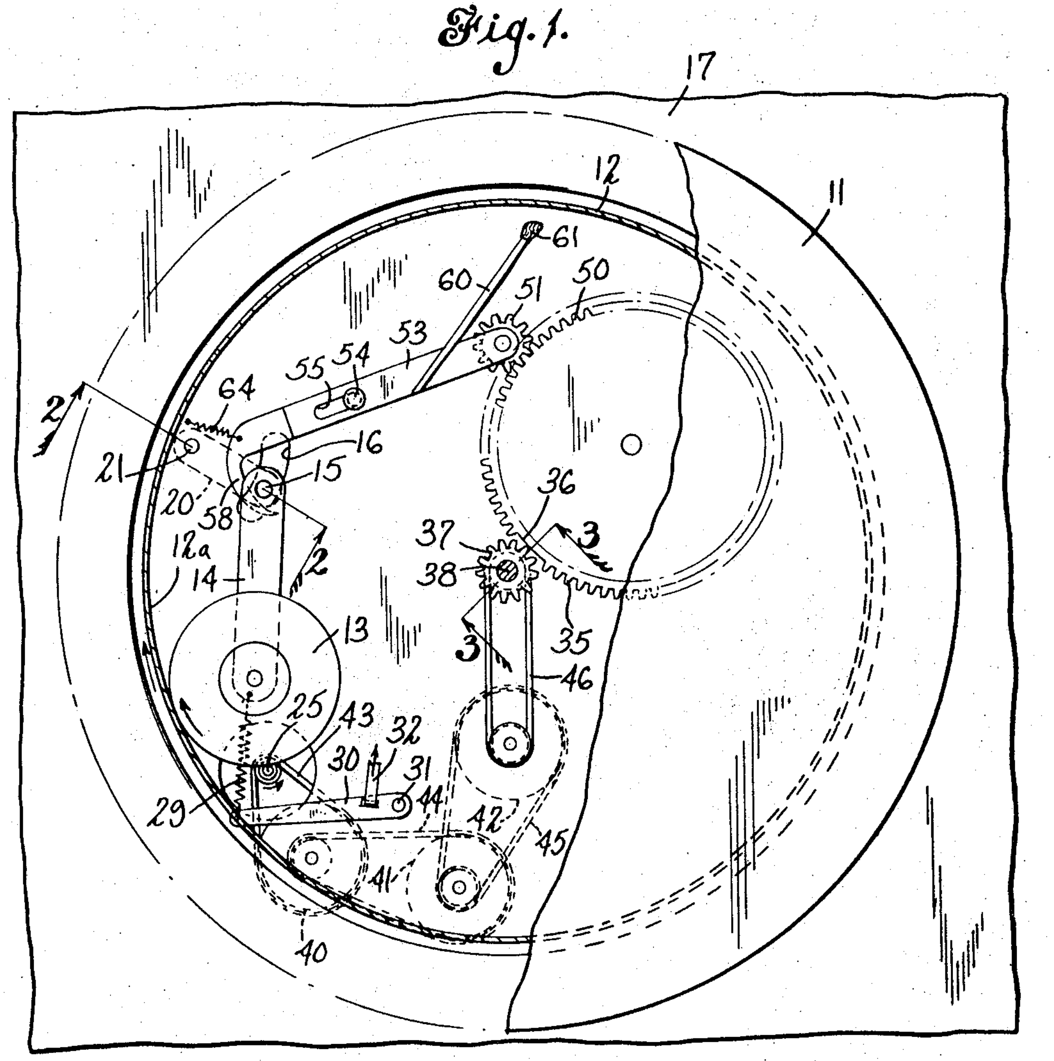
FIG. 1 is a top plan view of a turntable with certain parts broken away, according to the invention.
Figure 2:
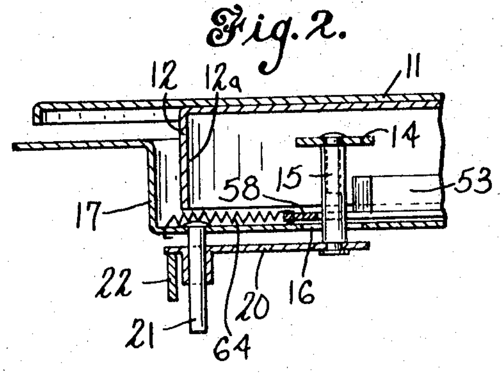
FIG. 2 is a sectional view taken along line 2–2 of FIG. 1.
Figure 3:
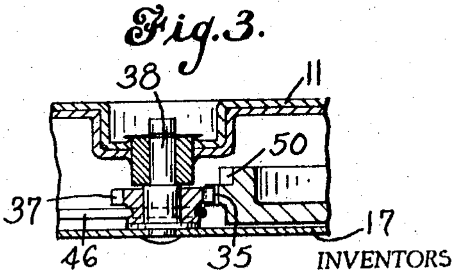
FIG. 3 is a sectional view taken along line 3–3 of FIG. 1.

Referring to FIGS. 1—3, there is shown a record player turntable 11, having a depending cylindrical portion 12 which is welded or otherwise attached to turntable 11. The inside surface 12*a* of the depending portion 12 provides a driving hub for a rubber puck shown at 13. The puck 13 is mounted for rotation on a bar 14 which is supported by a pin 15 which, in turn, is permitted to slide in a slot 16 in the bottom inside surface of the housing 17. The other end of pin 15 has a lever arrangement 20 which is slidably movable on a pin 21. A wedge cam 22 is affixed to lever 20. In this manner the puck 13 may be raised or lowered, such that the turntable speed may be changed. This is accomplished by changing the position of the puck 13 with respect to the different circumferential portions of a capstan drive shown at 25, the drive 25 being driven by a motor (not shown). This type of driving scheme is commonly utilized in today's record player, such as in the Garrard model 30 manufactured in England. To ensure that the puck 13 engages the capstan drive, a spring 29 is provided which is attached to a lever 30 pivoted at 31 to the surface 17. By moving a lever 32, a portion of which is shown in the drawing, the puck can be positioned against the capstan drive so that it will rotate the turntable 11. This arrangement is also commonly utilized in present-day record players in activating the turntable.

In order to operate the record changing apparatus of the presently available record players, such as the Garrard previously mentioned, a gear arrangement 35 is provided having a flattened portion 36 thereon wherein the teeth of the gear have been removed. In presently available record players this gear, when actuated, is utilized to drive the record changer apparatus as the gear 35 is rotated. To accomplish this, the prior art has utilized a gear of the type shown at 37 which is normally rigidly secured to the turntable 11. To cause the changer cycle to normally occur, there is generally provided on the record an end-of-record groove which will cause gear 35 to be moved to a position such that the teeth of the gear will engage the teeth of gear 37. The cycle will continue until the gear returns to the normal flatted position. During this time, the record changer apparatus will be in operation and the next record will descend onto the turntable.

In applicants' invention, this procedure has been slightly modified because, in the instant invention, the turntable is retained in a stopped position during the record changing cycle. Thus, instead of using gear 37, which is securely attached to turntable 11, the gear 37 is mounted on shaft 38 for rotatable motion thereon. Accordingly, to drive gear 37 during the changing cycle, an auxiliary driving mechanism is provided. This auxiliary driving system is shown as including pulleys 40—42 driven by belts 43—46, respectively. The belt 46 surrounds an elongated portion descending from the face of gear 37 in such manner that the gear 37 may be driven during the record changing cycle and thus effect rotation of gear 35.

In order to retain the turntable in a stationary position during the record changing cycle, applicants have provided a second gear 50 positioned on gear 35, for rotation therewith. The gear 50 engages another gear 51 positioned on a bar 53 which slides along the surface 17 and is guided thereon by a pin 54 positioned in a guide slot 55 formed in bar 53. The gear 51 is supported for rotation on the bar 53 and is frictionally seated (see FIG. 5) in a "frictional" bearing 70, so that there is frictional resistance to its freely turning. Thus, as gear 50 rotates, the gear 51 will creep up on it and draw the bar 53 with it. By making the gear 51 difficult to turn in its bearings 70 (frictional retardation), gear 51 will be forced to climb up on the gear 50 as it turns. When the gear 50 has stopped turning the spring 64, which is constructed to overcome the frictional forces on gear 51, will cause the gear to return to the left of FIGS. 1 and 4.

Figure 5:
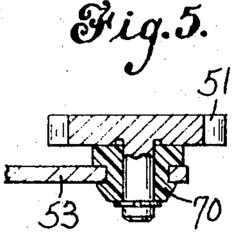
FIG. 5 is a sectional view of a bearing assembly, taken along line 5–5 of FIG. 4.
Figure 6:
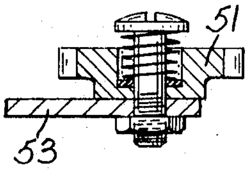
FIG. 6 is an alternate embodiment of a bearing assembly suitable for use in place of the bearing assembly shown in FIG. 5.

FIG. 6 shows a spring arrangement for applying a frictional force to accomplish the same result as accomplished with the bearing of FIG. 5. The spring of FIG. 6 is adjustable so as to permit the frictional force retarding the gear 51 to be adjusted.

Figure 4:
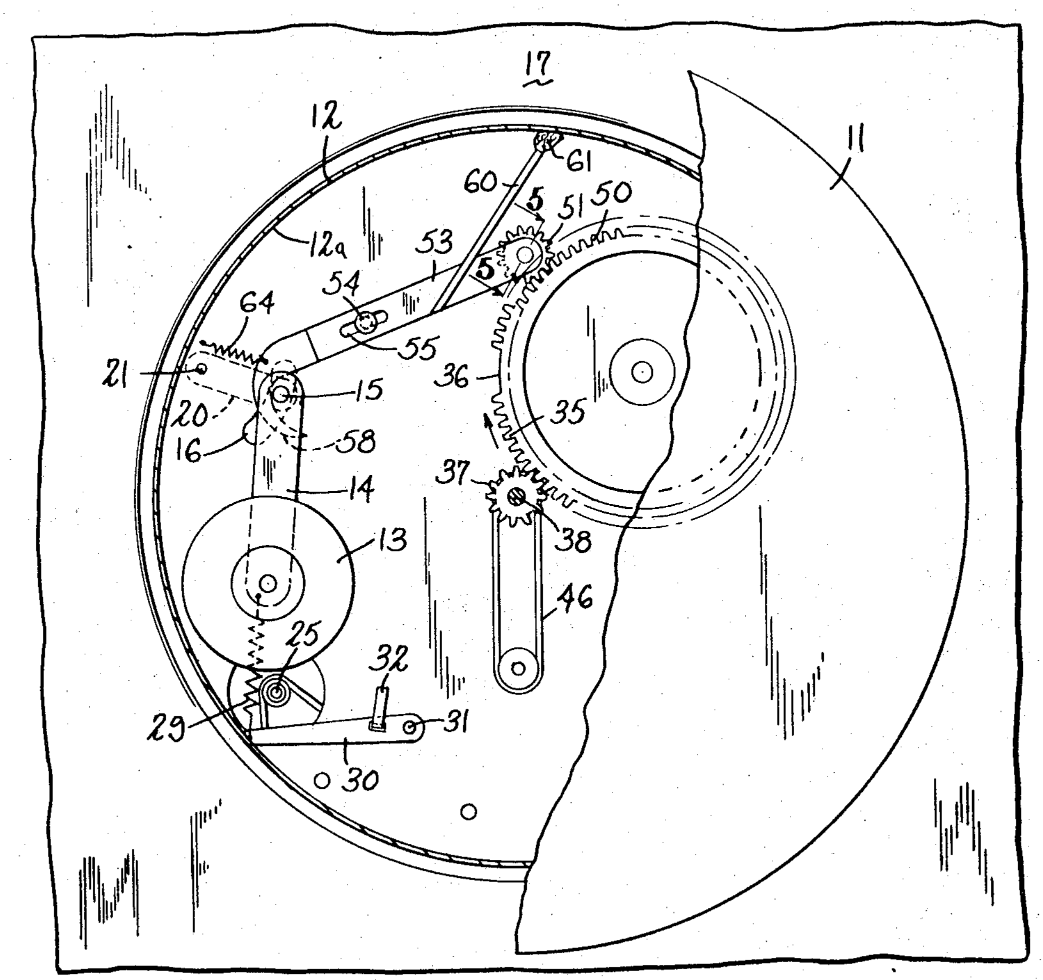
FIG. 4 is a view similar to FIG. 1, showing the mechanism according to the invention, in a different position.

The bar 53 includes a hooklike portion 58 on one end thereof and a bar portion 60 having a padded brake shoe 61 on one end thereof. The hook portion 58 of bar 53 is normally maintained away from the pin 15 by a spring 64 but, during the changing cycle, as the gear 35 begins to rotate, the gear 50 will rotate with it to cause bar 53 to move the right of FIG. 1, as shown in FIG. 4, to cause the puck 13 to separate from the capstan drive 25 and/or the rim 12*a* such that the turntable will no longer be driven. At the same time, the brake shoe 61 will engage the inner rim 12*a* of turntable 11 and brake it to a stop. When the record player has completed its record changing cycle, the gear 35 and the gear 50 will again come to a stop and spring 64 will cause the bar 53 to return to the left (FIG.

1) such that the puck 13 will once again engage the capstan drive 25, as well as the rim surface 12*a* and, therefore, the turntable will once again be free to move as the capstan drive 25 rotates. In this manner the turntable 11 is prevented from rotating during the record changing cycle. This has been accomplished by the addition of a mechanism which operates in a timed sequence with mechanism for changing a record. Thus, the turntable will be maintained at a standstill during the record changing cycle, such that any record descending from the record changer apparatus will engage a stationary turntable, thereby preventing the record from being scratched due to contaminants on the turntable or due to the friction between the descending record and another record already on the turntable. Accordingly, the fidelity of the records will be prevented from deteriorating as has heretofore occurred with the use of present-day record player devices.

It will thus be seen that the objects set forth, among those made apparent from the preceding description, are efficiently attained and since certain changes may be made in carrying out the construction without departing from the spirit and scope of the invention, it is intended that all matter contained in the above description or shown in the accompanying drawings shall be interpreted as illustrative and not in a limiting sense.

It is to be understood that the following claims are intended to cover all of the generic and specific features of the invention herein described and all statements of the scope of the invention which, as a matter of language, might be said to fall therebetween.

1. We claim:

1. In a record player of the class including a turntable, a drive capstan a puck engageable with the capstan and the turntable to drive the turntable and the record player including a member responsive to completion of the playing of a record for initiating a record dropping cycle, said responsive member comprising a rotatable element having a first gear defined thereon a first bar rotatably mounting said puck, resilient means acting on said first bar to urge said puck into engagement with said capstan and said turntable; the improvement comprising second gear adapted to engage said first gear transmission means interconnecting said drive capstan and said second gear, a slideably mounted bar having a third gear mounted thereto, at one end thereof and engaging said first bar at the other end thereof, said rotatable element having a fourth gear defined thereon which engages said third gear, said second bar carrying a brake shoe thereon adapted to engage said turntable so that when said second gear engages and drives said first gear, said fourth gear moves said second bar through said third gear to cause said brake shoe to engage said turntable and also to move said first bar against the urging of said resilient means away from said turntable and remove said puck from driving relation with said turntable.

2. The improvement of claim 1 wherein said second gear rotatably disposed about the spindle of the turntable.

3. The improvement of claim 2 wherein said first gear has a segment of teeth removed and said second gear has teeth normally disposed in the area of the removed segment, and means for limiting movement of said second arm.

4. The improvement of claim 1 wherein said first bar is pivotally mounted to a lever, and said second bar has a hooklike portion at one end thereof arranged to engage the pivotal connection of said first bar to said lever.